United States Patent
Iida et al.

[15] 3,695,551
[45] Oct. 3, 1972

[54] FILM WINDING DEVICE FOR MOTION-PICTURE CAMERAS

[72] Inventors: Yozo Iida; Hideyo Nozawa, both of Tokyo, Japan

[73] Assignee: Nippon Kogaku K.K., Tokyo, Japan

[22] Filed: Sept. 11, 1970

[21] Appl. No.: 71,484

[30] Foreign Application Priority Data

Sept. 16, 1969 Japan .................... 44/72748

[52] U.S. Cl. ................................................. 242/194
[51] Int. Cl. ...... G03b 1/04, G11b 15/32, G11b 23/04
[58] Field of Search ..................... 242/194, 205–210; 352/170, 172, 174, 175

[56] References Cited

UNITED STATES PATENTS

| 1,892,412 | 12/1932 | Steiner ..................... 352/172 |
| 2,224,383 | 12/1940 | Githens et al ............. 352/172 |
| 3,297,397 | 1/1967 | Grant et al ................ 352/172 |

*Primary Examiner*—Leonard D. Christian
*Attorney*—Harry G. Shapiro

[57] ABSTRACT

A film winding device for motion-picture cameras has a film counter and a signal means located in the film counter corresponding to the graduated scales of the film counter to signal when only a small length of the film from the leading or trailing ends of the film, respectively, is contained on the take-up or supply chambers in the magazine. Power transmission means is provided for transmitting the rotation of the drive means to the take-up spool in the film magazine and includes means for stopping rotation of the take-up spool which is responsive to the signal means.

10 Claims, 7 Drawing Figures

INVENTORS
YOZO IIDA
AND
HIDEYO NOZAWA
BY Harry G. Shapiro
ATTORNEY

FILM WINDING DEVICE FOR MOTION-PICTURE CAMERAS

BACKGROUND OF THE INVENTION

The present invention relates to a film winding device for motion-picture cameras. More particularly, the present invention relates to a device for winding film contained in a magazine, which device is provided with means for preventing the film from being loosely taken up within the magazine for double exposure photography when there is not sufficient space within the magazine for loosely taken up film, a situation which occurs before a predetermined length of film from the starting end of the film is advanced or when only a predetermined length of film is left on the supply spool for exposure.

In general, the magazines used in motion-picture cameras are provided with means for preventing reverse rotation in order to prevent slack in the wound film on the take-up spool or core. Double exposure is therefore not normally possible. However, when rewinding of the film is desired, such as for double exposures, the take-up spool or core of the film magazine is stopped to allow a predetermined length of film may be loosely fed into a space provided in the take-up chamber of the magazine so that double exposure becomes possible by rewinding the loosely fed film in this space. However, the space in the take-up chamber is not available all the time. When the film is first started, there is a large space into which the film may be loosely fed in the take-up chamber, but there is not space available in the supply chamber for return of the film which had been loosely fed into the take-up chamber. On the other hand, when almost all of the film is exposed and fed into the take-up chamber, there is not sufficient space available in the take-up chamber to receive the loosely fed film. When the film is forced into a small space, it will be severely damaged.

SUMMARY OF THE INVENTION

It is therefore one of the objects of the present invention to provide a film winding device for motion-picture cameras employing film magazines which device is capable of preventing the film from being forced into a small space not sufficient enough to take up the film thereby preventing the damage to the film when the normal film take-up spool is not operating.

In brief, the device in accordance with the present invention provides a first and second signal generating means which are located to correspond to the graduated scales of a counter disk indicates when a few feet of film from the starting and trailing ends of the film are contained in the magazine, and power transmission means for transmitting the rotation of drive means to a winding or take-up spool in the film magazine, which power transmission means can be interrupted in response to the signals from said first and second signal generating means.

DESCRIPTION OF THE PREFERRED EMBODIMENT

Figure 1:
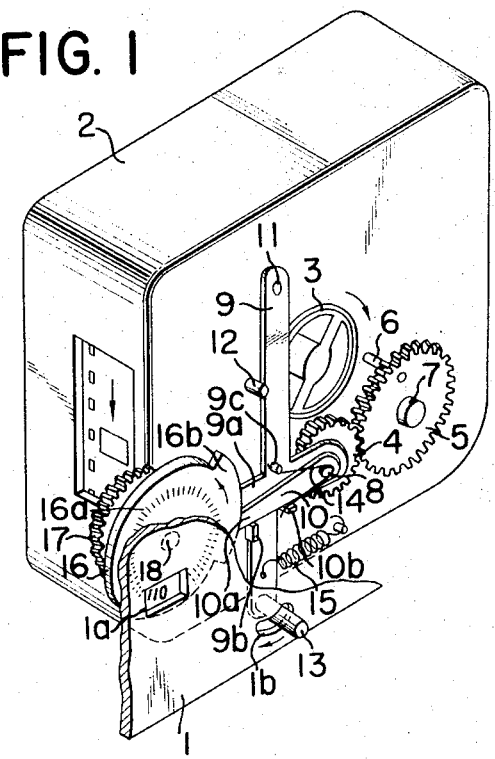
FIG. 1 is a perspective view of one preferred embodiment of the present invention.
Figure 2A:
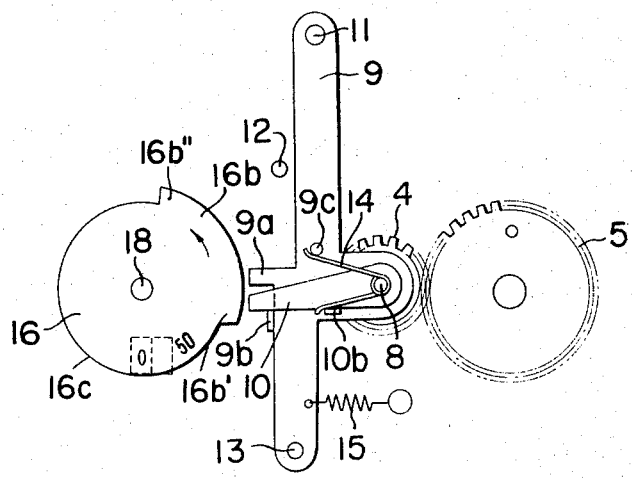
FIG. 2A through FIG. 2F show front views thereof, which illustrate a cycle from the start of the disk at stop position through the operative positions.

Referring to FIGS. 1 and 2A, reference numeral 1 designates a portion of a main body of a motion-picture camera employing a magazine 2; 1a, a counter window; 1b, an aperture through which a knob 13 extends; and 3, a film take-up core of film magazine 2 provided with means for preventing reverse rotation of the take-up core or spool so as to prevent slack of the film. The core 3 rotates only in the direction indicated by the arrow.

Referring to FIGS. 1 and 2A through 2F, a drive gear 4 carried by a shaft 8 may be moved into and out of mesh with a film winding gear 5 and is coupled to a shutter release mechanism (not shown) associated with the film transporting mechanism (not shown). The film winding gear 5 is rotatably carried by a shaft 7 which in turn is securely fixed to a stationary member of the camera such as the camera body 1. The gear 5 has a pin 6 which engages with the core 3 so as to rotate it in the clockwise direction, thereby winding the film. The upper end of a cross shaped operation lever 9 is rotatably fixed to the stationary member of the camera by a pivot 11 and is normally biased by spring 15 so that the drive gear 4 will normally engage the film winding gear 5 while pawl 9a and circular periphery 10a of the sector will not engage with the projections 16b of a disk 16. The disk 16 is carried by the shaft 18 so as to rotate in unison with a counter gear 17 which is drivingly coupled to the shutter release mechanism associated with the film transporting mechanism. The counter disk 16 has graduated scales 16a indicating the amount of the exposed film, which scales are viewed through the window 1a. The scales 16a are in numbers graduated with the figure 0, corresponding to starting, through the figure 50, corresponding to ending of the film supply.

A detecting lever 10 is carried by the shaft 8 coaxially of the drive gear 4 and is biased by a spring 14 so as to engage with a bent stop 9b of the operation lever 9. One end of the spring 14 is engaged with a projection 10b on the detecting lever 10 and the other end is engaged with a pin 9c on the operation lever 9. The pawl 9a on the lever 9 and the projection 10a of the detecting lever 10 constitutes stop means, and the width L thereof (FIG. 2c) as projected on the scale of counter disk 16 is made equal to or slightly larger than a predetermined amount of the film to be loosely fed for accomplishing overlapping photography.

Figure 2B:
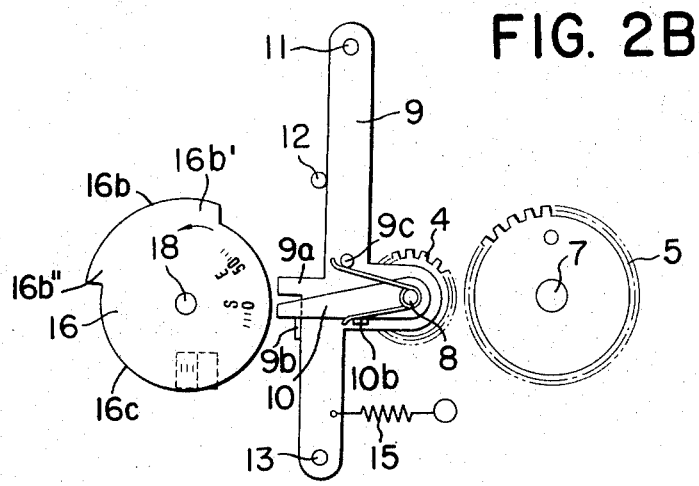

Referring to FIG. 2A which shows the state in which the counter disk is at a starting position, when a relatively large length of film is in the supply chamber of the magazine so that there is little space in this chamber into which the film may be rewound loosely, then one end portion 16b' of the sector 16b opposes the pawl 9a of the lever 9 so that the movement of the operation knob 13 is prevented, thereby preventing the disengagement of the drive gear 4 from the film winding gear 5 therefore, overlap or double exposure photograph is impossible. As shown in FIG. 2B, when the film is advanced so that sufficient space is provided in the supply chamber of the magazine for accommodating the loosely rewound exposed film, the end portion 16b' of the sector 16b is moved away from the pawl 9a. Thus, the operation knob 13 may be actuated to stop the rotation of the take-up core 3 so as to loosely transport the film in the take-up chamber and loosely rewind it in the supply chamber for overlap photography.

When most of the film has been exposed, i.e., in the final stage of photographing and a predetermined relatively short length of film remains in the supply chamber, the space in the supply chamber is increased while the space in the take-up chamber is correspondingly decreased so that it becomes impossible to loosely feed the film into the latter space. The detecting lever 10 is therefore provided to ensure that a predetermined space exists in the take-up chamber into which the film may be loosely fed when the drive gear 4 is disengaged from the film winding gear 5. The function of the detecting lever 10 will be described in detail hereinafter. Since overlap photography is possible between the 7th and 43rd scale lines, (i.e., there is sufficient space in either the supply or take-up chamber into which the film is loosely fed), the peripheral length of the smaller-radius portion 16c (or residual portion of the disk 16 except the sector 16b) corresponds to the 7th and 43rd scale lines. Assuming that the amount of the film required for overlap photography is equivalent to 3 scale lines, it is necessary to prevent the overlap photography when the amount of the exposed film is in excess of 40 scale lines. For this purpose, the detecting lever 10 is so arranged that the width L shown in FIG. 2C is equal to 3 scale lines and that the other end portion 16b" of the sector 16b opposes the lever 10 to prevent the movement of the operation knob 13 in the clockwise direction when the 40th scale line has passed through the counter window 1a (FIG. 2E).

Figure 2C:
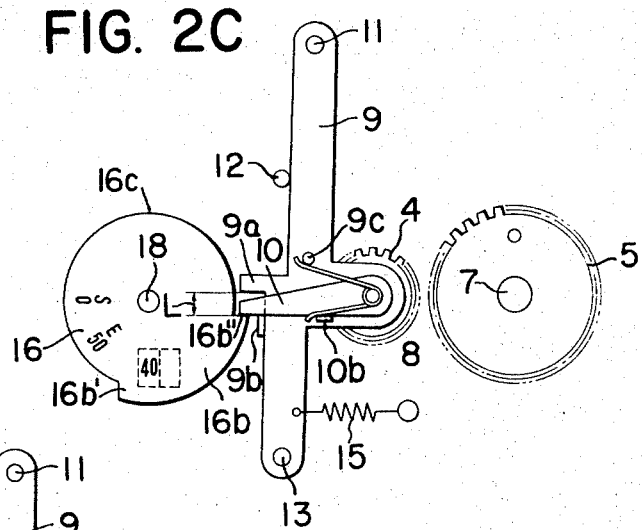
Figure 2D:
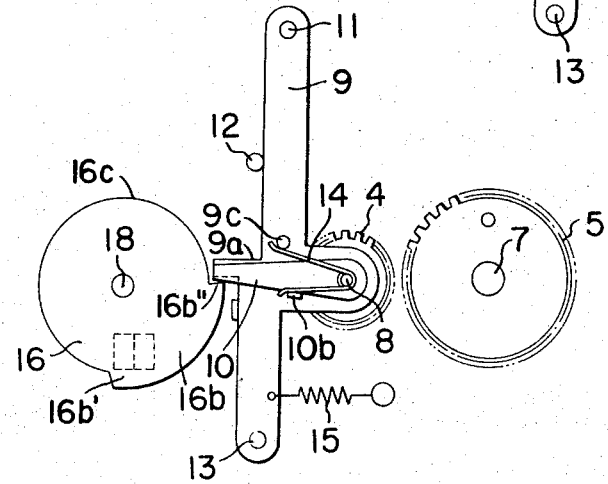
Figure 2E:
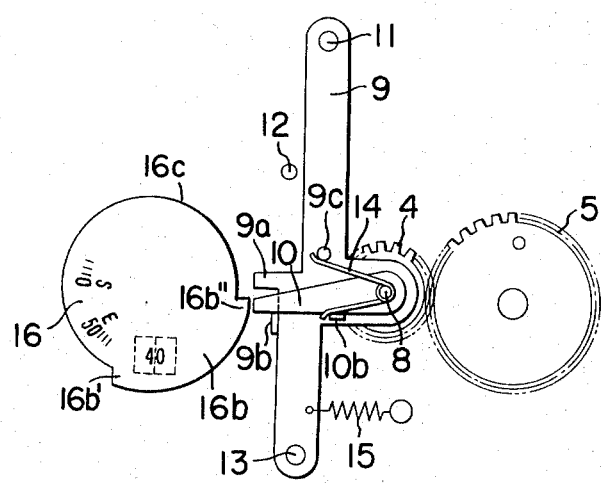
Figure 2F:
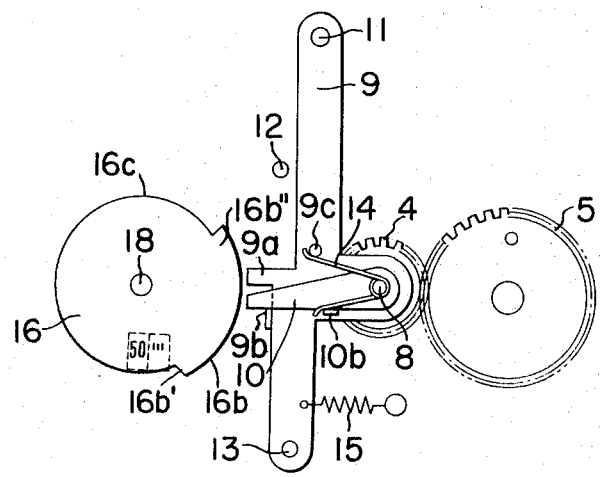

As shown in FIG. 2C, when the operation knob 13 is moved in order to loosely feed the film and the film is in the position as shown (the 40th scale line is seen through the counter window 1a), then the edge of the other end portion 16b' of the sector 16b pushes the detecting lever 10 against the spring 14 until the lever 10 nearly overlaps the engaging pawl 9a (FIG. 2D). During this time, a predetermined length of film corresponding to the width L (i.e., 3 scale lines is loosely fed into the take-up chamber by the film transporting mechanism (not shown). FIG. 2F shows the apparatus with the disk in its end position. A power transmission mechanism consists of the drive gear 4, winding gear 5, pin 6, shafts 7 and 8, operation lever 9, detecting lever 10, shaft 11, stopper pin 12, operation knob 13 and springs 14 and 15. The end portion 16b' constitutes a first signal generating member and the other end portion 16b" constitutes a second signal generating member. The counter disk 16 and counter gear 17 constitute a counter device. The counter gear 17 and disk 16 are interconnected through a friction spring (not shown) in order to calibrate the scales when the cartridges are replaced. In other words, the counter disk 16 may be rotated independently of the counter gear 17.

OPERATION

Next the mode of operation will be described. In normal photography, the operation lever 13 is not actuated (see FIG. 1 and FIGS. 2A, 2E and 2F). In this case, the film is pulled down by a pull down claws of the film transporting mechanism (not shown) in synchronization with a shutter (not shown) and the film winding gear 5 driven by the drive gear 4 rotates, through the pin 6, the take-up core 3 of the magazine in the clockwise direction so that the film may be wound without any slack.

When the overlap photography is desired, the film winding operation of the core 3 must be stopped while the film is advanced toward the pull down claws of the film transporting mechanism. At the beginning and end of the film, where there is insufficient space in either the supply or take-up chambers of the magazine into which the film may be fed loosely, the pawl 9a of the cross shaped operation lever 9 or the detecting lever 10 opposes the sector 16b in order to engage with the circular periphery thereof to prevent the actuation of the operation knob 13 (FIG. 2A, 2E and FIG. 2F). When the end portion 16b' of the sector 16b moves away from the pawl 9 (for example, when the 7th scale line appears through the window 1a, the operation knob 13 may be rotated in the clockwise direction indicated by the arrow until the operation lever 9 engages with the stopper pin 12 against the force of spring 15, so the drive gear 4 is disengaged from the film winding gear 5. Under this condition, since the film winding gear 5 is out of mesh with the drive gear 4, the core 3 stops rotating so that the film may be loosely fed into the take-up chamber in the magazine 2 by the pull down claws. The loosely fed film in the take-up chamber may be loosely fed back into the supply chamber by reverse rotation of the pull down claws of the film transporting mechanism. When predetermined length of film equal to that of the loosely fed film has been rewound, the knob 13 may be returned to its normal position and the shooting is started again for double exposure.

It will be appreciated that with the device of this invention, overlap photography cannot be performed when there is inadequate space for loosely feeding the film in either the take-up or supply chambers of the magazine.

What is claimed is:

1. A film winding device for a motion-picture camera, comprising a film counter, signal means movable in accordance with the film feeding and so located as to correspond to the graduated scales of the counter indicating a small length of the film from the starting and trailing ends of the film contained in a magazine, power transmission means for transmitting the rotation of drive means to a film take-up spool in the film magazine and including means for interrupting the rotation of the film take-up spool, stop means associated with the power transmission means and engageable with the signal means, the interruption of the power transmission means being prevented by said signal means when said stop means is engageable with said signal means.

2. A film winding device for a motion-picture camera according to claim 1, further comprising a rotatable disk having a sector projecting from the periphery thereof and having two end portions thereon, and wherein said signal means comprise the two end portions of said projecting sector.

3. A film winding device for a motion-picture camera according to claim 1, further comprising an operation member in said power transmission means, and wherein said stop means include a projecting member extending from said operation member and a biased member connected to said operation member.

4. A film winding device for a motion-picture camera according to claim 3 wherein said operation member is biased to maintain said projecting member and biased member out of engagement with said signal means.

5. In a motion-picture camera employing a film magazine having a supply chamber and take-up chamber and a member for preventing the reverse movement of film at the take-up core of the magazine, said motion-picture camera comprising means for transporting film; power transmission means for rotating the take-up core; stop means displaceable for stopping the rotation of the take-up core while said film transporting means is operated to loosely feed the film into the take-up chamber of the magazine and to loosely rewind the loosely fed film into the supply chamber of the magazine; and means for preventing said stop means from being displaced to stop the rotation of the take-up core when there is insufficient space in either the take-up or supply chamber into which the film is loosely fed.

6. A motion-picture camera according to claim 5, wherein said preventing means includes a movable member responsive to the film transporting means and having two signal portions; and said stop means being engageable with either one of said two signal portions to prevent displacement of said stop means, thereby preventing the stop means from stopping the rotation of the take-up core.

7. A motion-picture camera according to claim 5, wherein said power transmission means includes a first gear interlocked with the take-up core; a second gear releasably meshing with the first gear, said second gear being interlocked with the film transporting means; an operation member for selectively bringing the second gear into or out of engagement with the first gear; said preventing means includes a movable member responsive to the film transporting means and having two signal portions; said stop means mounted on the operation member to oppose the movable member, one of said two signal portions being arranged to oppose the stop means when there is insufficient space in the take-up chamber of the magazine into which the film is loosely fed, the other signal portion being arranged to oppose the stop means when there is insufficient space in the supply chamber of the magazine into which the film is loosely rewound, movement of the operation member to bring the second gear out of engagement with the first gear being prevented by engagement of the stop means with one of the two signal portions when one of the portions opposes said stop means.

8. A motion-picture camera according to claim 7, wherein said stop means includes a projection fixed on the operation member and a biased member connected to the operation member spaced from the projection member by a predetermined length in the opposite direction of movement for the movable member.

9. A motion-picture camera according to claim 7, wherein said movable member is in the form of a disk with a projecting sector portion serving as said two signal portions.

10. A motion-picture camera according to claim 8, wherein said movable member is in the form of a disk having a projecting sector portion of larger diameter serving as said two signal sections; said stop means is biased out of engagement with said movable member and includes a projection member fixed on the operation member and a biased member spaced from the projection member by a predetermined length corresponding to an amount of movement for the moving means to allow a predetermined amount of film to be transported and loosely fed; the projecting member and biased member of the stop means adapted to engage the projecting sector of the movable member; aid movable member disposed with relation to the means for transporting film and said stopping means so that the projecting sector will be opposed to one of the projecting member and biased member of the stop means when there is insufficient space in one of the film supply and film take-up chambers of the magazine thereby preventing movement of the operation member to bring the first and second gear out of engagement and so that the projecting sector will not be opposed to either of projecting member and biased member of the stopping means when there is sufficient space in both the film supply and film take-up chambers, thereby allowing movement of the operation member to disengage the second gear from the first gear.

* * * * *